(12) United States Patent
Watson et al.

(10) Patent No.: US 10,580,065 B2
(45) Date of Patent: Mar. 3, 2020

(54) RETAIL VENUE DELIVERING AN ENHANCED CUSTOMER EXPERIENCE

(71) Applicant: Disney Enterprises, Inc., Burbank, CA (US)

(72) Inventors: Scott F. Watson, Marina Del Rey, CA (US); Lanny S. Smoot, Thousand Oaks, CA (US); Danny J. Donnell, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 441 days.

(21) Appl. No.: 15/623,306

(22) Filed: Jun. 14, 2017

(65) Prior Publication Data
US 2018/0365758 A1   Dec. 20, 2018

(51) Int. Cl.
*G06Q 30/00* (2012.01)
*G06Q 30/06* (2012.01)
*G06F 8/61* (2018.01)
*H04L 29/06* (2006.01)

(52) U.S. Cl.
CPC .......... *G06Q 30/0643* (2013.01); *G06F 8/61* (2013.01); *H04L 67/42* (2013.01)

(58) Field of Classification Search
None
See application file for complete search history.

(56) References Cited

U.S. PATENT DOCUMENTS

| 9,911,290 B1 * | 3/2018 | Zalewski | G07G 1/0072 |
| 2010/0064007 A1 * | 3/2010 | Randall | G06Q 30/02 |
| | | | 709/204 |

* cited by examiner

*Primary Examiner* — Mila Airapetian
(74) *Attorney, Agent, or Firm* — Farjami & Farjami LLP

(57) ABSTRACT

According to one implementation, a system for delivering an enhanced customer experience includes a retail venue having a computing platform interactively linked to a display screen, a camera system, a virtual jukebox, and an audio system. The computing platform includes a hardware processor and a memory storing a venue content control software code. The hardware executes the venue content control software code to receive a camera data corresponding to a customer of the retail venue from the camera system, and display an image representing the customer on the display screen, based on the camera data. The hardware processor further executes the venue content control software code to receive an audio selection data from the virtual jukebox identifying a music selection received by the virtual jukebox as an input from another customer, determine an audio playlist including the music selection, and playout the audio playlist using the audio system.

20 Claims, 4 Drawing Sheets

RETAIL VENUE DELIVERING AN ENHANCED CUSTOMER EXPERIENCE

BACKGROUND

The convenience and efficiency of e-commerce has had a devastating impact on traditional brick-and-mortar retail outlets, and has even come to threaten their viability as a business model. Perhaps no effort on the part of traditional retailers can enable an in-store shopping experience to compete with an online product search and purchase on the grounds of speed or ease. Even the maintenance of an extensive inventory of goods and the presence of a well trained and attentive sales staff may be inadequate to overcome the inconvenience associated with traveling to and from a brick-and-mortar retail outlet to complete a purchase.

If traditional retail outlets are in fact to survive and prosper, they must offer customers a shopping experience including enhancements that cannot be readily replicated in an online environment. Thus, there is a need for a commercial solution enabling a brick-and-mortar retail venue to deliver an enhanced customer experience sufficiently attractive to motivate potential shoppers to do their browsing and purchasing in-store.

SUMMARY

There are provided retail venues delivering an enhanced customer experience, substantially as shown in and/or described in connection with at least one of the figures, and as set forth more completely in the claims.

DETAILED DESCRIPTION

Figure 1:
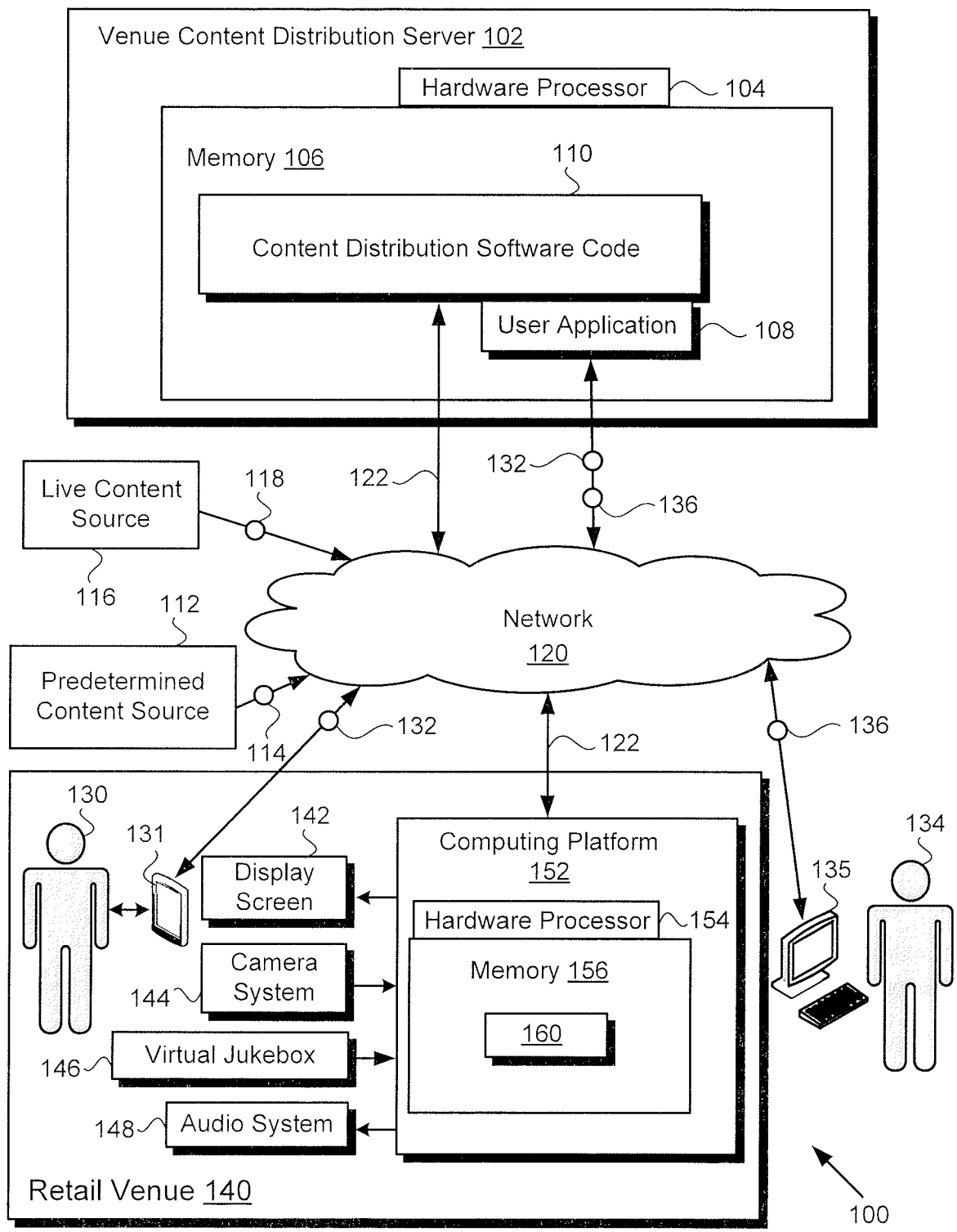
FIG. 1 shows a diagram of an exemplary system including a retail venue for delivering an enhanced customer experience, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As described above, the convenience and efficiency of e-commerce has had a devastating impact on traditional brick-and-mortar retail outlets. For example, it seems that no effort on the part of traditional retailers can enable an in-store shopping experience to compete with an online product search and purchase on the grounds of speed or ease. Consequently, even the maintenance of an extensive inventory of goods and the presence of a well trained and attentive sales staff may be inadequate to overcome the inconvenience associated with traveling to and from a brick-and-mortar retail outlet to complete a purchase.

However, and as further described above, if traditional retail outlets are in fact to survive and prosper, they must offer customers a shopping experience including enhancements that cannot be readily replicated in an online environment. By creating a retail venue providing an immersive and interactive customer experience that blends shopping with entertainment and participatory group activities, the present application discloses such a commercial solution. As a result, the present application advantageously discloses a brick-and-mortar retail venue designed to deliver an enhanced customer experience sufficiently attractive to motivate potential shoppers to do their browsing and purchasing in-store.

FIG. 1 shows a diagram of exemplary system 100 including retail venue 140 for delivering an enhanced customer experience, according to one implementation. As shown in FIG. 1, retail venue 140 includes computing platform 152 interactively linked to display screen 142, camera system 144, virtual jukebox 146, and audio system 148 of retail venue 140. As further shown in FIG. 1, computing platform 152 has hardware processor 154, and system memory 156 storing venue content control software code 160.

According to the exemplary implementation shown in FIG. 1, system 100 is remotely linked to venue content distribution server 102 over communication network 120, via network communication links 122. Venue content distribution server 102 includes hardware processor 104, server memory 106, and content distribution software code 110 residing in server memory 106 and providing user application 108. Also shown in FIG. 1 are predetermined content source 112 providing predetermined content 114, and live content source 116 providing live content feed 118.

In addition, FIG. 1 shows customer 130 of retail venue 140, located within retail venue 140, and using mobile communication device 131 to send customer data 132 to venue content distribution server 102 and/or to receive customer data 132 from venue content distribution server 102. Further shown in FIG. 1 is remote user 134, located outside of retail venue 140, and using personal communication device 135 to send user data 136 to venue content distribution server 102 and/or to receive user data 136 from venue content distribution server 102.

According to the exemplary implementation shown in FIG. 1, customer 130 of retail venue 140 may interact with various assets of retail venue 140 in order to enjoy an enhanced customer experience. For example, camera system 144 may capture an image of customer 130 for display on display screen 142, either as a faithful photographic representation of customer 130, or as an avatar corresponding to customer 130, for example. In addition customer 130 may interact with virtual jukebox 146 to select music for inclusion in a music playlist of virtual jukebox 146 played out over audio system 148 of retail venue 140.

In some implementations, customer 130 may further interact with assets within retail venue 140 via venue control distribution server 102 and communication network 120. For example, customer 130 may download and install user application 108 on mobile communication device 131, and may utilize user application 108 to select music for inclusion in the music playlist of virtual jukebox 146 played out over audio system 148.

Alternatively, or in addition, customer 130 may utilize user application 108 to participate in a multi-player video game displayed on display screen 142. Moreover, in some implementations, remote user 134 may download and install user application 108 on personal communication device 135, and may utilize user application 108 to compete with customer 130 in a multi-player video game displayed on display screen 142, or to submit user content 136 for display on display screen 142.

It is noted that although FIG. 1 depicts venue content distribution server 102 as a single computing platform, more generally, venue content distribution server 102 may include one or more computing platforms, such as computer servers for example, which may be co-located, or may form an interactively linked but distributed system. For example, venue content distribution server 102 may be implemented as a cloud based system. As a result, hardware processor 104 and server memory 106 may correspond to distributed processor and memory resources of such a cloud based system. It is further noted that communication network 120 may take the form of a packet-switched network, such as the Internet, for example.

Although mobile communication device 131 is depicted as a smartphone, in FIG. 1, in other implementations, mobile communication device 131 may be any mobile device usable by customer 130 to send and receive customer data 132 over communication network 120. Thus, in other implementations, mobile communication device 131 may be a tablet computer or digital media player, for example. Moreover, although personal communication device 135 is depicted as a personal computer (PC), in FIG. 1, that representation is also provided merely by way of example. In other implementations, personal communication device 135 may take the form of any of a laptop computer, tablet computer, digital media player, gaming console, or smartphone, for example.

Figure 2:
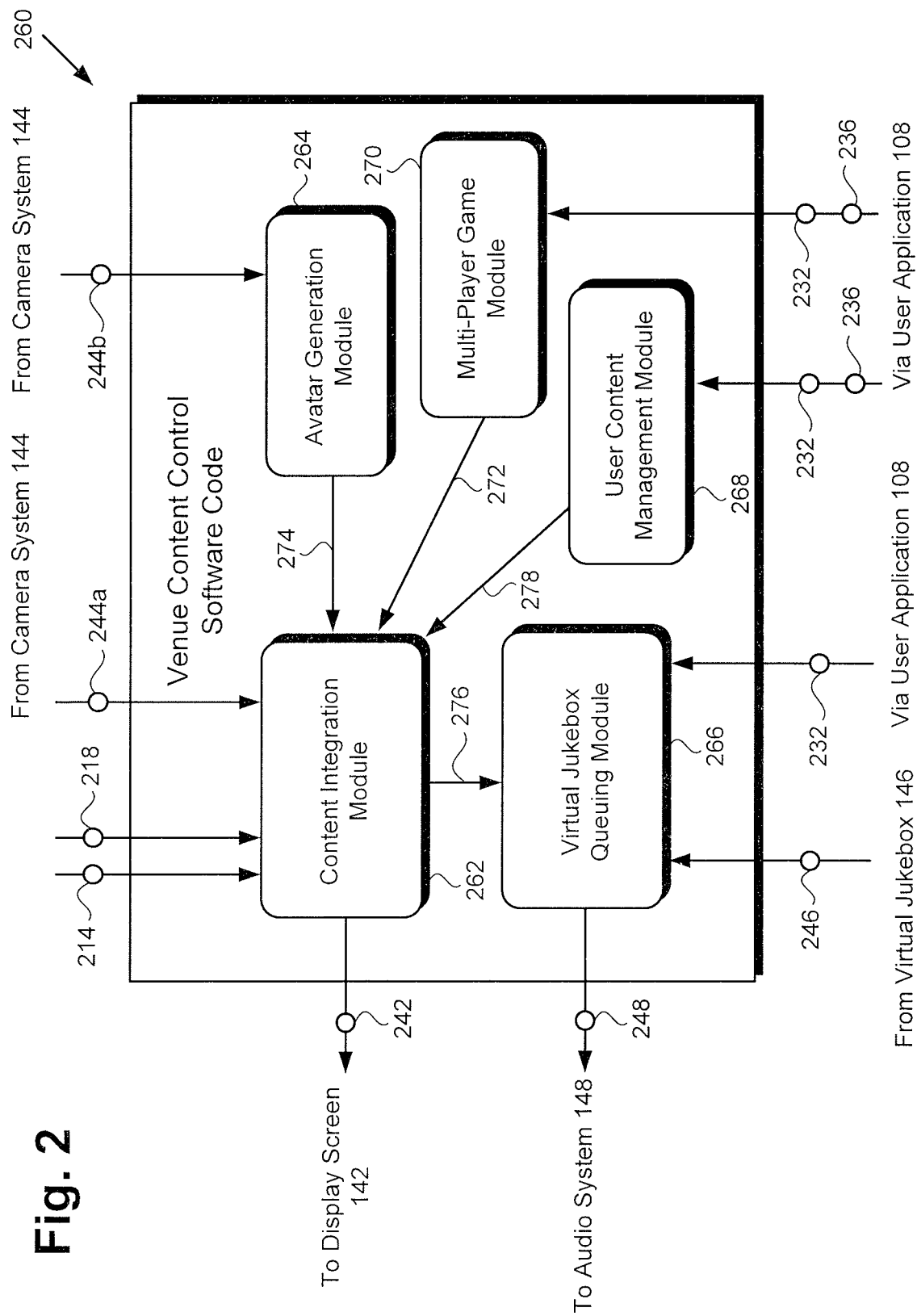
FIG. 2 shows a diagram of an exemplary venue content control software code suitable for use by a system including a retail venue for delivering an enhanced customer experience, according to one implementation.

FIG. 2 shows a more detailed diagram of exemplary venue content control software code 260 suitable for use by computing platform 152 of retail venue 140, in FIG. 1, according to one exemplary implementation. Venue content control software code 260 may receive predetermined content 214, live content feed 218, and camera data 244*a* and/or 244*b* from camera system 144, in FIG. 1, and may provide display data 242 as an output to display screen 142. In addition, venue content control software code 260 may receive customer data 232 and/or user data 236 via user application 108, and may provide display data 242 as an output to display screen 142 corresponding to those inputs. Moreover, venue content control software code 260 may receive audio selection data 246 from virtual jukebox 246, in FIG. 1, and/or customer data 232 via user application 108, and may provide audio playlist 248 as an output to audio system 148.

As shown in FIG. 2, according to the present exemplary implementation, venue content control software code 260 includes content integration module 262, avatar generation module 264, virtual jukebox queuing module 266, user content management module 268, and multi-player game module 270. Also shown in FIG. 2 are avatar 274 generated by venue content control software code 260 using avatar generation module 264, gaming data 272 provided by multi-player game module 270, default audio playlist 276, and user content 278.

Venue content control software code 260 corresponds in general to venue content control software code 160, in FIG. 1, and those corresponding features may share any of the characteristics attributed to either corresponding feature by the present disclosure. Thus, although not explicitly shown in FIG. 1, like venue content control software code 260, in FIG. 2, venue content control software code 160 includes features corresponding respectively to content integration module 262, avatar generation module 264, virtual jukebox queuing module 266, user content management module 268, and multi-player game module 270.

Figure 3:
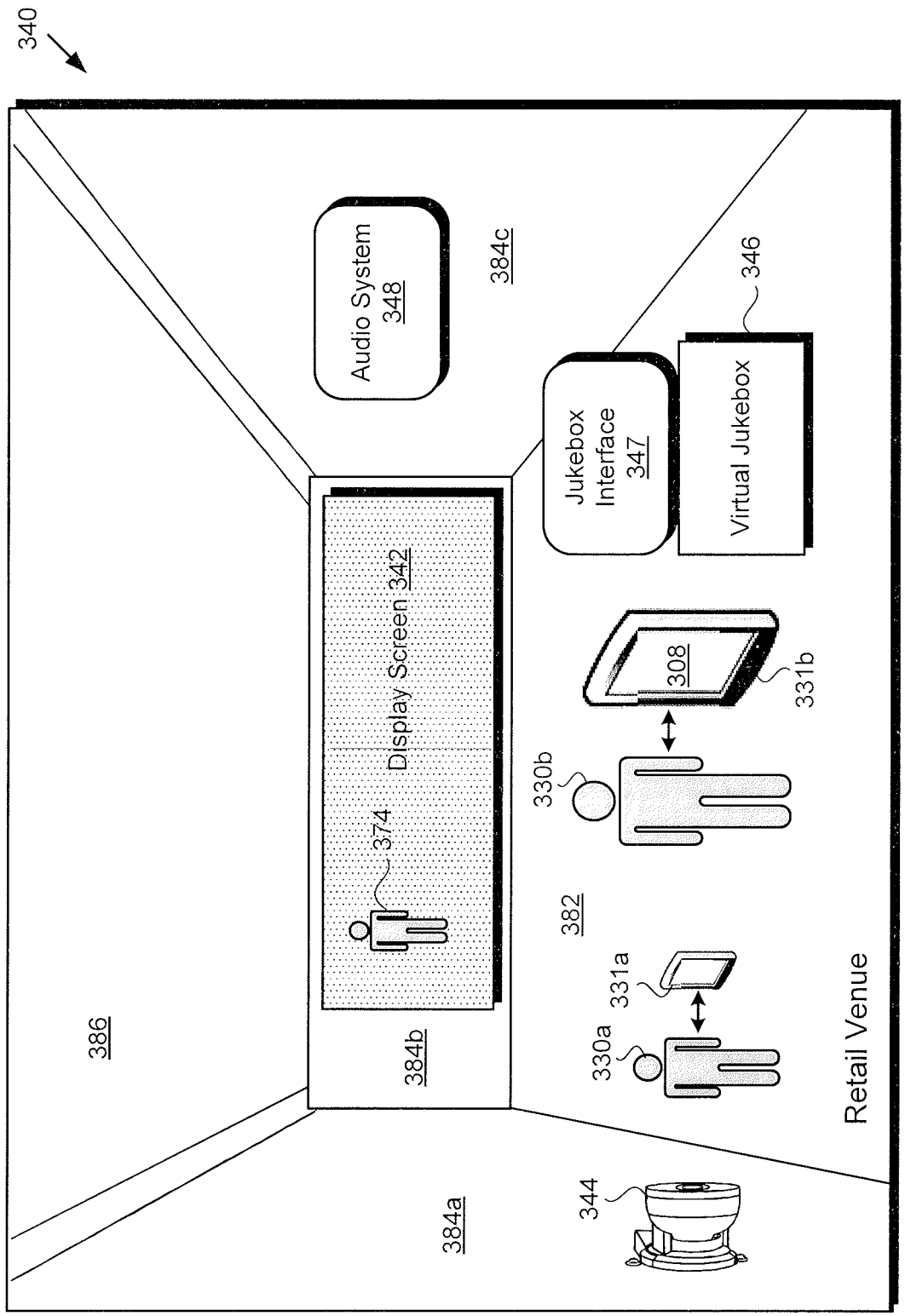
FIG. 3 shows an exemplary retail venue for delivering an enhanced customer experience, according to one implementation.

FIG. 3 shows exemplary retail venue 340 for delivering an enhanced customer experience, according to one implementation. As shown in FIG. 3, retail venue 340, which may be a brick-and-mortar store, for example, includes floor space 382, walls 384*a*, 384*b*, and 384*c*, and ceiling 386. In addition, retail venue 340 includes display screen 342, camera system 344, virtual jukebox 346 including jukebox interface 347, and audio system 348. Also shown in FIG. 3 are customers 330*a* and 330*b* possessing respective mobile communication devices 331*a* and 331*b*, user application 308 installed on mobile communication device 331*b*, and avatar 374 of customer 330*a* displayed on display screen 342.

Retail venue 340 corresponds in general to retail venue 140, in FIG. 1, and those corresponding features may share any of the characteristics attributed to either corresponding feature by the present disclosure. That is to say, although not explicitly shown in FIG. 3, like retail venue 140, in FIG. 1, retail venue 340 includes a computing platform corresponding to computing platform 152 having hardware processor 154, and memory 156 storing venue content control software code 160/260. Moreover, like computing platform 152, the computing platform of retail venue 340 is interactively linked to display screen 342, camera system 344, virtual jukebox 346, and audio system 348.

In addition, user application 308, display screen 342, camera system 344, virtual jukebox 346, and audio system 348 correspond respectively in general to user application 108, display screen 142, camera system 144, virtual jukebox 146, and audio system 148, in FIG. 1, and those corresponding features may share any of the characteristics attributed to either corresponding feature by the present disclosure. Moreover, customers 330*a* and 330*b*, and mobile communication devices 331*a* and 331*b* correspond respectively to customer 130 and mobile communication device 131, in FIG. 1, while avatar 374 corresponds in general to avatar 274, in FIG. 2. Thus, like mobile communication devices 131 and 331*b*, mobile communication device 131 has user application 108/308 installed thereon.

Figure 4:
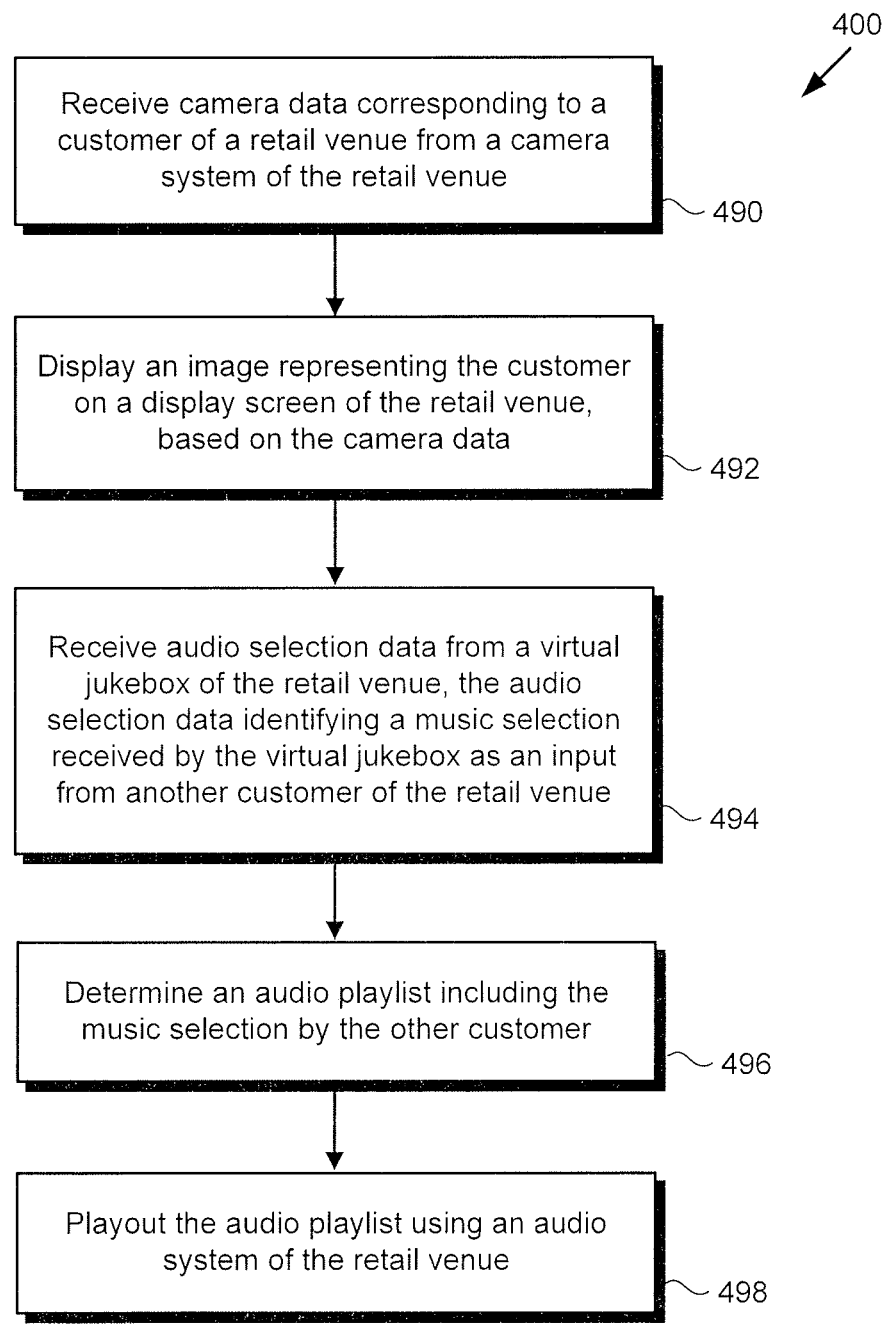
FIG. 4 shows a flowchart presenting an exemplary method for use by a system including a retail venue for delivering an enhanced customer experience, according to one implementation.

The functionality of system 100 including retail venue 140/340 will be further described by reference to FIG. 4 in combination with FIGS. 1, 2, and 3. FIG. 4 shows flowchart 400 presenting an exemplary method for use by a system including a retail venue for delivering an enhanced customer experience, according to one implementation. With respect to the method outlined in FIG. 4, it is noted that certain details and features have been left out of flowchart 400 in order not to obscure the discussion of the inventive features in the present application.

Referring to FIG. 4 in combination with FIGS. 1, 2, and 3, flowchart 400 begins with receiving camera data 244*a*/244*b* from camera system 144/344, camera data 244*a*/244*b* corresponding to customer 130/330*a* of retail venue 140/340 (action 490). Camera data 244*a*/244*b* may be received from camera system 144/344 by venue content control software code 160/260, executed by hardware processor 154 of computing platform 152.

As shown in FIG. 3, camera system 144/344 may be mounted on wall 384*a* of retail venue 140/340, and may be configured to capture an image of customer 130/330a as customer 130/330a enters retail venue 140/340, or while customer 130/330a browses or shops in retail venue 140/340. Camera system 144/344 may include a still camera, such as single shot camera, and/or a video camera. Thus, in some implementations, camera data 244a/244b may be video of customer 130/330a.

Flowchart 400 continues with displaying an image representing customer 130/330a on display screen 142/342, based on camera data 244a/244b (action 492). Display screen 142/342 may be a large, wall mounted or wall inset display screen, for example. In some implementations, for instance, display screen 142/342 may occupy substantially all of wall 384b of retail venue 140/340. Display screen 142/342 may take the form of a liquid crystal display (LCD), a light-emitting diode (LED) display, an organic light-emitting diode (OLED) display, or another suitable display screen that performs a physical transformation of signals to light. Moreover, in the absence of, or in addition to the image representing customer 130/330a, display screen 142/342 may display predetermined content 114/214 and live feed content 118/218.

Predetermined content 114/214 may be received by venue content control software code 160/260 over communication network 120, either directly from predetermined content source 112, or from predetermined content source 112 via venue content distribution server 102. For example, in implementations in which predetermined content source 112 is a commercial or creative affiliate of retail venue 140/340, predetermined content source 112 may be authorized to deliver predetermined content 114/214 in the form of movie trailers, advertising, or games, for example, directly to retail venue 140/340. However, in implementations in which predetermined content source 112 is a third party provider of predetermined content 114/214, predetermined content 114/214 may be reviewed, filtered, or edited by venue content distribution server 102 prior to being transferred to computing platform 152 of retail venue 140/340 via communication network 120.

Analogously, live content feed 118/218 may be received by venue content control software code 160/260 over communication network 120, either directly from live content source 116, or from live content source 116 via venue content distribution server 102. That is to say, in implementations in which live content source 116 is an entertainment venue, such as a theme park, affiliated with retail venue 140/340, live content source 116 may be authorized to deliver live content feed 118/218 in the form of coverage of live entertainment activities, such as parades, taking place at the affiliate entertainment venue. However, in implementations in which live content source 116 is a third party provider of live content feed 118/218, live content feed 118/218 may be reviewed, filtered, or censored by venue content distribution server 102 prior to being transferred to computing platform 152 of retail venue 140/340 via communication network 120.

The image representing customer 130/330a may be displayed on display screen 142/342 by venue content control software code 160/260, executed by hardware processor 154 of computing platform 152, and using avatar generation module 264 and/or content integration module 262. For example, in some implementations, avatar generation module 264 may generate avatar 274/374 of customer 130/330a based on camera data 244b. In those implementations, avatar 274/374 may be transferred to content integration module 262 and may be blended into, i.e., integrated with, predetermined content 114/214.

As a specific example, avatar 274/374 of customer 130/330a may be generated so as to resemble a character in a movie trailer included in predetermined content 114/214. Content integration module 262 could be utilized by venue content control software code 160/260 to integrate avatar 274/374 into predetermined content 114/214 so as to result in avatar 274/374 of customer 130/330a appearing in the movie trailer including the character that avatar 274/374 resembles.

Alternatively, the image of customer 130/330a displayed on display screen 142/342 may be a substantially faithful photographic or video representation of customer 130/330a as customer 130/330a reacts in real-time to another image concurrently displayed on display screen 142/342. For example, customer 130/330a may be a child present in retail venue 140/340 on that child's birthday, and the image of customer 130/330a reacting in real-time to another image may be the image of the child reacting in real-time to a celebration of that child's birthday concurrently displayed on display screen 142/342.

As a specific example, remote user 134 may correspond to a parent or other relative of customer 130/330a, i.e., a relative of the child, filming themselves saying "happy birthday" to the child, and/or may utilize user application 108/308 to obtain pictures or videos from other family members and friends in preparation for the child's birthday. The videos and pictures may be loaded into a themed video and submitted through user application 108/308 and/or venue content distribution server 102 for review and approval. On the child's birthday, the family can be present at retail venue 140/340, and the themed video can be displayed on display screen 142/342 as user content 278, along with the child's real-time reaction to watching the video on display screen 142/342.

Thus, in some implementations, the other image or images concurrently displayed on display screen 142/342 may be received from remote user 134 via venue content distribution server 102 and communication network 120. Alternatively, or in addition, in some implementations, the other image or images concurrently displayed on display screen 142/342 may include predetermined content 114/214 and/or live feed content 118/218 received via communication network 120.

Flowchart 400 continues with receiving audio selection data 246 from virtual jukebox 146/346, where audio selection data 246 identifies a music selection received by virtual jukebox 146/346 as an input from another customer 330b of retail venue 140/340 (action 494). As shown in FIG. 3, in some implementations, virtual jukebox 146/346 may include jukebox interface 347, which may be a touch screen or voice activated interface, for example.

Customer 330b may utilize jukebox interface 347 to select music, such as a music track including a song or melody from a movie soundtrack, for example, to be played in retail venue 140/340. Use of jukebox interface 347 by customer 330b to make a music selection results in generation of selection data 246 by virtual jukebox 146/346. Selection data 246 may be received from virtual jukebox 146/346 by venue content control software code 160/260, executed by hardware processor 154 of computing platform 152.

Flowchart 400 continues with determining audio playlist 248 including the music selection by customer 330b (action 496). Audio playlist 248 may be determined by venue content control software code 160/260, executed by hardware processor 154 of computing platform 152, and using virtual jukebox queuing module 266.

In some implementations, venue content control software code 160/260 may use virtual jukebox queuing module 266 to prioritize the order in which music selections are played out. For example, default audio playlist 276 may include predetermined audio selections from predetermined content 114/214 and/or live audio included in live content feed 118/218. In those instances, venue content control software code 160/260 may use virtual jukebox queuing module 266 to determine in what order to interleave the music selection by customer 330b and identified by audio selection data 246 with the audio content included in default audio playlist 276, to produce audio playlist 248.

In one implementation, for example, live audio included in live content feed 118/218 may have priority over all other content, while predetermined audio selections included in predetermined content 114/214 may be of secondary priority with respect to live audio, but take priority over the music selection by customer 330b identified by audio selection data 246. Moreover, in some implementations, default audio playlist 276 may include predetermined audio gaps for inclusion of one or more music selections made by customers of retail venue 140/340. In those implementations, for example, the predetermined audio gaps reserved for customer selected music may be populated in the order in which audio selection data 246 identifying individual music selections is received, i.e., the order in which jukebox interface 347 receives inputs selecting music tracks.

In some implementations, Flowchart 400 can conclude with playing out audio playlist 248 using audio system 148/348 (action 498). Audio system 148/348 may be a venue wide audio system, such as a theater quality Dolby® high definition (HD) surround-sound system, for example. Moreover, in some implementations, audio system 148/348 may be synchronized with display screen 142/342 to produce an immersive multi-media environment within retail venue 140/340. Playout of audio playlist 248 using audio system 148/348 of venue 140/340 may be performed by venue content control software code 160/260, executed by hardware processor 154 of computing platform 152.

According to some implementations, the method of flowchart 400 may further include receiving another audio selection data via venue content distribution server 102 and communication network 120. For example, in addition to the music selection entered by customer 330b via virtual jukebox interface 347 and identified by audio selection data 246, customer 330b may choose to make another audio selection using mobile communication device 331b. In that that case, customer 330b may identify another music selection by inputting the selection to mobile communication device 331b possessed by customer 330b, through use of user application 108/303.

Installation and use of user application 108/308 by customers 130/330a/330b may be advantageous or desirable for a number of reasons. For example, the presence of user application 108/308 on mobile communication devices 131/331a/33 1b may facilitate delivery of promotional content and marketing materials for retail venue 140/340 to customers 130/330a/330b. In those situations in which use of user application 108/308 by customers 130/330a/330b is preferred, priority may be given to music selections and/or content submitted via user application 108/308.

For example, where audio playlist 248 includes a music selection received as an input to virtual jukebox 146/346 and another music selection received as an input to user application 108/308, the music selection received via user application 108/308 may be prioritized over the music selection received via virtual jukebox 146/346. That is to say, in such an implementation, the music selection received via user application 108/308 may be played using audio system 148/348 before the music selection received via virtual jukebox 146/346 regardless of which music selection is received first by venue content control software code 160/260.

In addition, in some implementations, retail venue 140/340 may enable customers 130/330a/330b and remote user 134 to compete in multi-player video games displayed in retail venue 140/340 on display screen 142/342. For example, customers 130/330a/330b and remote user 134 may transmit customer data 132/232 and user data 136/236, respectively, to venue content control software code 160/260, via user application 108/308, communication network 120, and venue content distribution server 102.

In those use cases, customer data 132/232 and user data 136/236 may include gaming inputs for processing by venue content control software code 160/260, executed by hardware processor 154 of computing platform 152, and using multi-player game module 270. Processing of the gaming inputs included in customer data 132/232 and user data 136/236 results in generation of gaming data 272, which may be integrated into display data 242 for display on display screen 142/342 using content integration module 262.

Thus, the present application discloses commercial solutions providing a shopping experience that includes enhancements that cannot be readily replicated in an online environment. The retail venues disclosed in the present application provide immersive and interactive customer experiences that blend shopping with entertainment and participatory group activities. As a result, the present application advantageously discloses brick-and-mortar retail venues delivering enhanced customer experiences sufficiently attractive to motivate potential shoppers to do their browsing and purchasing in-store.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for delivering an enhanced customer experience, the system comprising:
   a retail venue including a computing platform interactively linked to a display screen, a camera system, a virtual jukebox, and an audio system;
   the computing platform having a hardware processor and a memory storing a venue content control software code;
   the hardware processor configured to execute the venue content control software code to:
   receive a camera data from the camera system, the camera data corresponding to a first customer of the retail venue;
   display an image representing the first customer on the display screen, based on the camera data;

receive an audio selection data from the virtual jukebox, the audio selection data identifying a music selection received by the virtual jukebox as an input from a second customer of the retail venue;

determine an audio playlist including the music selection by the second customer; and playout the audio playlist using the audio system.

2. The system of claim 1, wherein the camera system comprises a video camera, and the camera data comprises video.

3. The system of claim 1, wherein the hardware processor is further configured to execute the venue content control software code to generate an avatar of the first customer based on the camera data.

4. The system of claim 3, wherein the image representing the first customer and displayed on the display screen comprises the avatar of the first customer.

5. The system of claim 1, wherein the image representing the first customer and displayed on the display screen comprises a video image of the first customer reacting in real-time to another image concurrently displayed on the display screen.

6. The system of claim 5, wherein the computing platform is remotely linked to a venue content distribution server over a communication network, and wherein the another image concurrently displayed on the display screen is received from a remote user via the venue content distribution server and the communication network.

7. The system of claim 5, wherein the computing platform is remotely linked to a venue content distribution server over a communication network, and wherein the another image concurrently displayed on the display screen is predetermined content received via the communication network.

8. The system of claim 5, wherein the computing platform is remotely linked to a venue content distribution server over a communication network, and wherein the another image concurrently displayed on the display screen is live feed content received via the communication network.

9. The system of claim 5, wherein the hardware processor is further configured to execute the venue content control software code to receive another audio selection data via the venue content distribution server and the communication network, and wherein the another audio selection data identifies another music selection received as an input from the second customer of the retail venue to a user application on a mobile communication device possessed by the second customer.

10. The system of claim 9, wherein the audio playlist includes the music selection by the second customer and the another music selection by the second customer, and wherein the another music selection received via the user application is prioritized over the music selection received via the virtual jukebox.

11. A method for use by a system including a retail venue having a computing platform interactively linked to a display screen, a camera system, a virtual jukebox, and an audio system, the computing platform having a hardware processor and a memory storing a venue content control software code, the method comprising:

receiving, using the hardware processor, a camera data from the camera system, the camera data corresponding to a first customer of the retail venue;

displaying, using the hardware processor, an image representing the first customer on the display screen, based on the camera data;

receiving, using the hardware processor, an audio selection data from the virtual jukebox, the audio selection data identifying a music selection received by the virtual jukebox as an input from a second customer of the retail venue;

determining, using the hardware processor, an audio playlist including the music selection by the second customer; and playing out the audio playlist, using the hardware processor and the audio system.

12. The method of claim 11, wherein the camera system comprises a video camera, and receiving the camera data comprises receiving video.

13. The method of claim 11, further comprising generating, using the hardware processor, an avatar of the first customer based on the camera data.

14. The method of claim 13, wherein the image representing the first customer and displayed on the display screen comprises the avatar of the first customer.

15. The method of claim 11, wherein the image representing the first customer and displayed on the display screen comprises a video image of the first customer reacting in real-time to another image concurrently displayed on the display screen.

16. The method of claim 15, wherein the computing platform is remotely linked to a venue content distribution server over a communication network, and wherein the another image concurrently displayed on the display screen is received from a remote user via the venue content distribution server and the communication network.

17. The method of claim 15, wherein the computing platform is remotely linked to a venue content distribution server over a communication network, and wherein the another image concurrently displayed on the display screen is predetermined content received via the communication network.

18. The method of claim 15, wherein the computing platform is remotely linked to a venue content distribution server over a communication network, and wherein the another image concurrently displayed on the display screen is live feed content received via the communication network.

19. The method of claim 15, wherein the hardware processor is further configured to execute the venue content control software code to receive another audio selection data via the venue content distribution server and the communication network, and wherein the another audio selection data identifies another music selection received as an input from the second customer of the retail venue to a user application on a mobile communication device possessed by the second customer.

20. The method of claim 19, wherein the audio playlist includes the music selection by the second customer and the another music selection by the second customer, and wherein the another music selection received via the user application is prioritized over the music selection received via the virtual jukebox.

* * * * *